(12) United States Patent
Glahe (10) Patent No.: US 10,211,567 B1
(45) Date of Patent: Feb. 19, 2019

(54) BRACKETS AND MODULES ATTACHABLE TO ELECTRICAL OUTLET AND SWITCH COVERS

(71) Applicant: ABCR, Inc., Denver, CO (US)

(72) Inventor: Charles D. Glahe, Denver, CO (US)

(*) Notice: Subject to any disclaimer, the term of this patent is extended or adjusted under 35 U.S.C. 154(b) by 0 days.

(21) Appl. No.: 16/112,705

(22) Filed: Aug. 25, 2018

(51) Int. Cl.
*H01R 13/60* (2006.01)
*H02J 7/00* (2006.01)
*H01R 13/447* (2006.01)
*H01R 13/72* (2006.01)
*F16M 13/02* (2006.01)
*H02G 3/14* (2006.01)

(52) U.S. Cl.
CPC ............. *H01R 13/60* (2013.01); *F16M 13/02* (2013.01); *H01R 13/447* (2013.01); *H01R 13/72* (2013.01); *H02G 3/14* (2013.01); *H02J 7/0044* (2013.01)

(58) Field of Classification Search
CPC ...... H01R 13/60; H01R 13/447; F16M 13/02; H02G 3/14; H02G 3/185; H02J 7/044
See application file for complete search history.

(56) References Cited

U.S. PATENT DOCUMENTS

| 2,084,953 | A |  | 6/1937 | Gibson |  |
|---|---|---|---|---|---|
| 2,943,138 | A |  | 6/1960 | Reager |  |
| 3,113,996 | A |  | 12/1963 | Sanford |  |
| 4,339,045 | A |  | 7/1982 | Bodin |  |
| 4,566,666 | A |  | 1/1986 | Meska et al. |  |
| 4,605,817 | A | * | 8/1986 | Lopez | H01R 13/6395 174/67 |
| 4,921,444 | A |  | 5/1990 | Cama |  |

(Continued)

FOREIGN PATENT DOCUMENTS

| CA | 2 852 337 A1 | 11/2015 |
|---|---|---|
| EP | 1 174 962 A2 | 1/2002 |

(Continued)

OTHER PUBLICATIONS

The Original Outlet Wall Mount Hanger Stand for Home Voice Assistants No Messy Wires or Screws Dot Accessories, Wall Mount Stand Holder Stand Bracket for All-New Echo Dot 2nd Generation; 2018: https://www.amazon.com/dp/B0789CMLPR/ref=sspa_dk_detail_3?psc=1 &pd_rd_i=B0789CMLPR&pd_rd_wg=V6u7i&pd_rd_r=6KQ84C07SJQPHEZ221VN&pd_rd_w=byy4f.

(Continued)

*Primary Examiner* — Dhiru R Patel
(74) *Attorney, Agent, or Firm* — Shifrin Patent Law; Dan Shifrin (57) ABSTRACT

A removable bracket securable to an electrical outlet or switch cover is provided, comprising a base section comprising a straight edge and having a slot formed therethrough, the slot configured to receive a tab of an attachable module. The base section further comprises a rear surface having a channel formed therein adjacent to a first edge of the slot, into which the tab of the module mates when the module is attached to the bracket. An elongated tab section extends from the straight edge and is securable behind an edge of the electrical outlet or switch cover. The tab section has a thickness less than a thickness of the base section and a rear surface contiguous with a rear surface of the base section. And an elongated first ridge on a front surface of the tab section is parallel to the straight edge of the base section.

16 Claims, 12 Drawing Sheets

(56) References Cited

U.S. PATENT DOCUMENTS

| | | | |
|---|---|---|---|
| 6,130,384 | A | 10/2000 | Esteves et al. |
| 6,576,837 | B1 | 6/2003 | Pimentel |
| 6,638,083 | B2 * | 10/2003 | Rhude .................... H01R 13/60 439/142 |
| 6,969,803 | B1 | 11/2005 | Friedberg |
| 7,067,737 | B2 | 6/2006 | Mallen |
| 7,230,181 | B2 | 6/2007 | Simmons et al. |
| D617,173 | S | 6/2010 | Anzalone et al. |
| 7,812,257 | B2 | 10/2010 | Gunderman et al. |
| 9,065,263 | B2 | 6/2015 | Porcano |
| D750,466 | S | 3/2016 | McCoy et al. |
| 9,551,454 | B2 | 1/2017 | Lipke et al. |
| 2008/0272258 | A1 | 11/2008 | Wysoczynski |
| 2011/0132634 | A1 | 6/2011 | Fetzer-Westmeister |
| 2015/0129722 | A1 | 5/2015 | Green |
| 2015/0281815 | A1 | 10/2015 | Rip et al. |
| 2015/0340826 | A1 | 11/2015 | Chien |
| 2017/0055705 | A1 | 3/2017 | Ritch |

FOREIGN PATENT DOCUMENTS

| | | |
|---|---|---|
| GB | 2487897 | 8/2012 |
| GB | 2502271 | 11/2013 |
| WO | 2016/019047 A1 | 2/2016 |

OTHER PUBLICATIONS

EchoGear Outlet Shelf; 2018: https://www.amazon.com/ECHOGEAR-Outlet-Shelf-Space-Saving-Built/dp/B06XPJP32R/ref=pd_sim_196_2?_encoding=UTF8&pd_rd_i=B06XPJP32R&pd_rd_r=6KQ84C07SJQPHEZ221VN&pd_rd_w=0uVvg&pd_rd_wg=V6u7i&psc=1&refRID=6KQ84C07SJQPHEZ221VN.

CloverTale Home Outlet Wall Mount Holder for Alexa Echo Dot, Bose, Anker, Home Mini round speakers; 2018: https://www.amazon.com/CloverTale-Outlet-Holder-speakers-Accessories/dp/B0769D6G65/ref=pd_sbs_485_5?_encoding=UTF8&pd_rd_i=B0769D6G65&pd_rd_r=JHMGWEHMT0YSBHHMKV5Q&pd_rd_w=VOyrr&pd_rd_wg=qSCIX&psc=1&refRID=JHMGWEHMT0YSBHHMKV5Q.

CloverTale Outlet Wall Mount Holder Stand for Alexa Echo Dot, Home Mini by Google Round Speaker Accessories; 2018: https://www.amazon.com/dp/B078PGZVBM/ref=sspa_dk_detail_3?psc=1&pd_rd_i=B078PGZVBM&pd_rd_wg=2ZOSc&pd_rd_r=GQBB6416M5AA82T0Z6KJ&pd_rd_w=37tEg.

Outlet Wall Mount Hanger Stand Bracket for Amazon Echo Dot 2nd Without Mess Wires or Screws, Dot Accessories, Compact Holder Case Plug in Kitchens, Bathroom and Bedroom; 2018: https://www.amazon.com/Bracket-Without-Accessories-Kitchens-Bathroom/dp/B0763TW3B7/ref=sr_1_5?s=home-garden&ie=UTF8&qid=1517341839&sr=1-5&keywords=echo+dot+stands.

This Dottie—Plug-in Mount—Amazon Echo Dot 2nd Generation Accessory; 2018: https://www.amazon.com/This-Dottie-Plug-Generation-Engineered/dp/B074NVNNKF/ref=pd_sim_485_14?_encoding=UTF8&pd_rd_i=B074NVNNKF&pd_rd_r=P0SSHN3P7B9C86EW8JV1&pd_rd_w=tITF1&pd_rd_wg=TKTTC&psc=1&refRID=P0SSHN3P7B9C86EW8JV1.

The Mini Back Pack: The First Simplest and Cleanest High-End Outlet Wall Mount Hanger Stand for Home Mini Voice Assistants by Google; 2018: https://www.amazon.com/Mini-Back-Pack-Simplest-Assistants/dp/B078JZFBBK/ref=pd_sbs_196_1?_encoding=UTF8&pd_rd_i=B078JZFBBK&pd_rd_r=9WSH8VGPEBGBYNBPK31N&pd_rd_w=4WIDF&pd_rd_wg=t25SE&psc=1&refRID=9WSH8VGPEBGBYNBPK31N.

* cited by examiner

BRACKETS AND MODULES ATTACHABLE TO ELECTRICAL OUTLET AND SWITCH COVERS

RELATED APPLICATION DATA

The present application is related to commonly-owned U.S. application Ser. No. 15/887,227, now U.S. Pat. No. 10,084,300, entitled INTEGRATED ELECTRICAL OUTLET COVER AND SUPPORT FOR VOICE-CONTROLLED ASSISTANTS, SPEAKERS, AND OTHER ELECTRONIC DEVICES, which patent is incorporated herein by reference in its entirety. The present application is also related to commonly-owned and co-pending U.S. application Ser. Nos. 29/661,232 entitled REMOVABLE BRACKET and 29/661,233 entitled REMOVABLE SHELF, both filed on the filing date hereof, which applications are incorporated herein by reference in their entireties.

TECHNICAL FIELD

The present invention relates generally to electrical outlet and switch covers and, in particular, to brackets securable to outlet and switch covers and to accessories attachable to the brackets.

BACKGROUND ART

Recent technological innovations have produced wireless speakers, and voice-controlled assistants, among other devices. Moreover, such devices have been miniaturized to such an extent that many now require very little space. The Alexa-based Amazon Echo Dot and the Google Home Mini are two such devices. While these and other devices may be battery powered, they do need occasional recharging. And, if they need a constant power source, they must be plugged in all of the time. Typically, the user connects the device to a charger plugged into an electrical wall socket. One end of a flexible cable with, for example, a standard USB connector, plugs into the charge and the other end with, for example, a mini USB connector, plugs into the device.

The small footprint of the electronic devices allows them to be placed on a shelf, table, counter, or other horizontal surface, often permanently or semi-permanently plugged in to a charger using the USB cable. Some may also be placed in a bracket secured to a wall using, for example, an adhesive or screws. For aesthetics, safety, or convenience, it is often desirable that any excess length of even a short USB cable be coiled or hidden.

Some device holders have been designed to make it easier to allow an electronic device to be located close to a wall-mounted electrical outlet. One such holder provides a small shelf above the outlet on which the device may be placed. Another holder provides a rigid pocket that fits onto pegs protruding through an opening in a wall plate next to an opening through which the outlet is accessible. Still another holder hangs from a charger that is plugged into an outlet. Some of these holders, as well as others, require specially designed or modified electrical outlet or switch cover plates.

There is also a need for conveniently located small shelves, hooks, and other such accessories to hold not just small electronic devices as above, but other small items, such as keys, eyeglasses, and the like.

SUMMARY OF THE INVENTION

Embodiments of the present invention provide a removable bracket securable to an electrical outlet or switch cover, comprising a base section comprising a straight edge and having a slot formed therethrough, the slot configured to receive a tab of an attachable module. The base section further comprises a rear surface having a channel formed therein adjacent to a first edge of the slot, into which the tab of the module mates when the module is attached to the bracket. An elongated tab section extends from the straight edge and is securable behind an edge of the electrical outlet or switch cover. The tab section has a thickness less than a thickness of the base section and a rear surface contiguous with a rear surface of the base section. And an elongated first ridge on a front surface of the tab section is parallel to the straight edge of the base section.

Embodiments of the present invention also provide a system comprising the removable bracket and a module attachable to the bracket. Modules include, without limitation, a horizontal shelf, one or more hooks, an open-top cylinder, and a module for retaining round wireless speaker, voice-controlled assistants, and the like.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Embodiments of the present invention provide brackets that may be removably attached to the top, bottom, or sides of an unmodified, conventional electrical switch or outlet cover plate. FIGS. 1A and 1B illustrate front and rear perspective views, respectively, an embodiment of a bracket 100 for retaining items below or above an electrical switch or outlet cover plate and FIG. 1C illustrates the bracket 100 installed at the bottom of a switch cover 10.

Figures 1A, 1B, 1C:
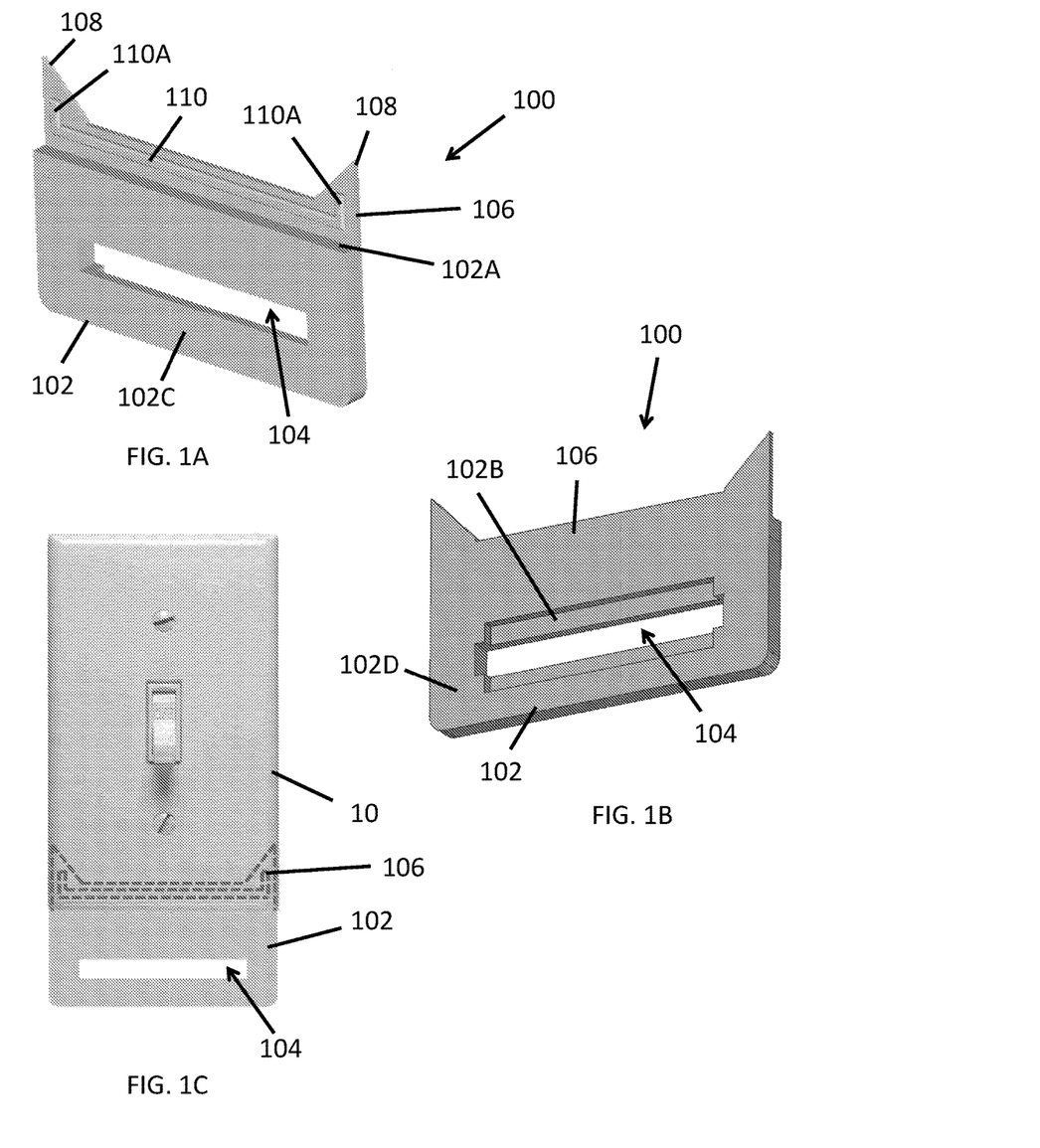
FIG. 1A illustrates a front perspective view of an embodiment of a bracket for retaining items below or above an electrical switch or outlet cover plate.
FIG. 1B illustrates a rear perspective view of the bracket of FIG. 1A.
FIG. 1C illustrates the bracket of FIG. 1A installed at the bottom of a switch cover.

The terms "top," "bottom," "front," "rear," "horizontally," and "vertically" as used herein are referenced to the orientation of the item being described, such as the bracket 100 illustrated in FIGS. 1A-1C. The bracket 100 has a base section 102 with a straight top edge 102A, a front surface 102C, and a rear surface 102D (FIG. 1B). Although the base section 102 of the bracket 100 illustrated in FIGS. 1A-1C is rectangular, the base 102 may be another regular or irregular shape having the straight top edge 102A. The base 102 has a rectangular slot 104 formed therethrough parallel to the top edge 102A.

Extending vertically from the top edge 102A of the bracket 100 is an elongated tab section 106 having a thickness less than the thickness of the base 102. The tab section 106 may include triangular side sections 108. The tab section 106 includes a ridge 110 extending horizontally parallel to the top edge 102A. A smaller ridge 110A extends vertically into the side sections 108 from each side of the ridge 110, perpendicular to the top edge 102A.

Turning to FIG. 1B illustrating the rear view of the bracket 100, the base section 102 and the tab section 106 are preferably formed as a single, continuous piece. In the rear of the base 102 adjacent to at least the top of the slot 104, and optionally also the bottom, is an elongated channel 102B.

FIG. 1C illustrates the bracket 100 installed at the bottom of a switch cover 10. To install, the cover 10 is loosened and the tab section 110 (shown in broken line) of the bracket 100 is slipped up behind the back of the cover 10 so that the ridge 110 and side ridges 110A are inside of the perimeter around the back of the cover 10. The cover 10 is re-tightened against the bracket 100 holding it in place. As will be described with respect to FIG. 5, the bracket 100 may also be installed at the top of a switch cover 10 by turning the bracket 100 180°.

Figures 2A, 2B, 2C:
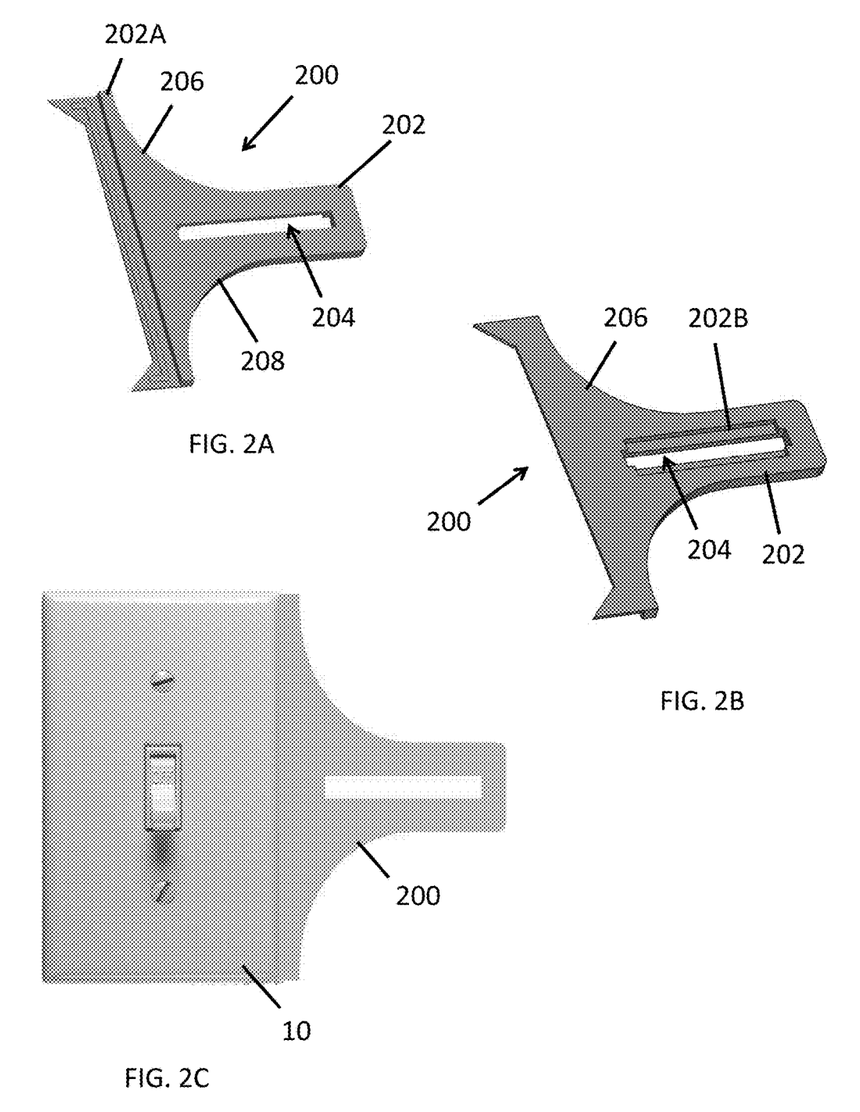
FIG. 2A illustrates a front perspective view of an embodiment of a bracket for retaining items to the side of an electrical switch or outlet cover plate.
FIG. 2B illustrates a rear perspective view of the bracket of FIG. 2A.
FIG. 2C illustrates the bracket of FIG. 2A installed at the side of a switch cover.

FIGS. 2A and 2B illustrate front and rear perspective views, respectively, an embodiment of a bracket 200 for retaining items to either side of an electrical switch or outlet cover plate and FIG. 2C illustrates the bracket 200 installed in one side of the switch cover 10. The bracket 200 is similar to the bracket 100 and includes a base section 202, with a side edge 202A, and a tab section 206. A rectangular slot 204 is formed perpendicular to the side edge 202A. An elongated channel 202B in the rear of the base 202 extends along at least the top of the slot 204 and, optionally, also along the bottom.

Figure 3A:
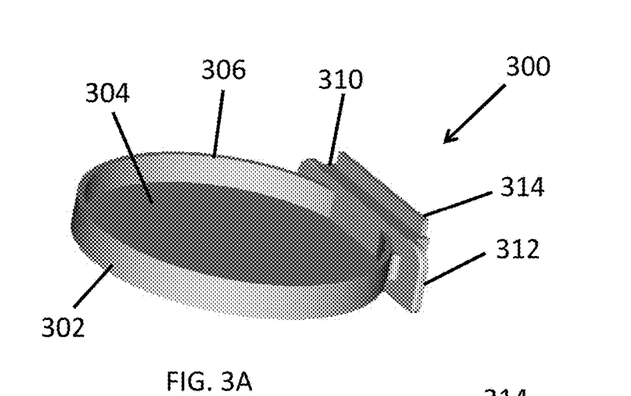
FIG. 3A illustrates a front perspective view of an embodiment of a shelf that is attachable to the bracket of FIG. 1A or FIG. 2A.
Figure 3B:
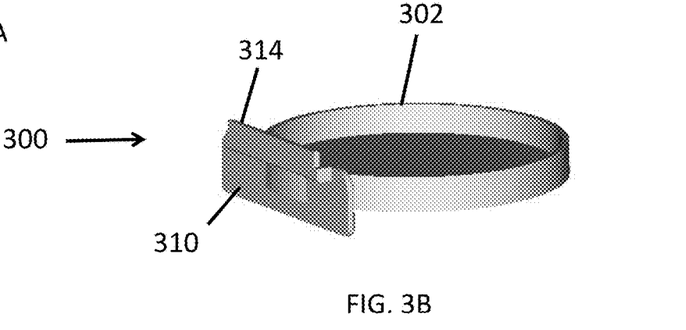
FIG. 3B illustrates a rear perspective view of the shelf of FIG. 3A.
Figure 3C:
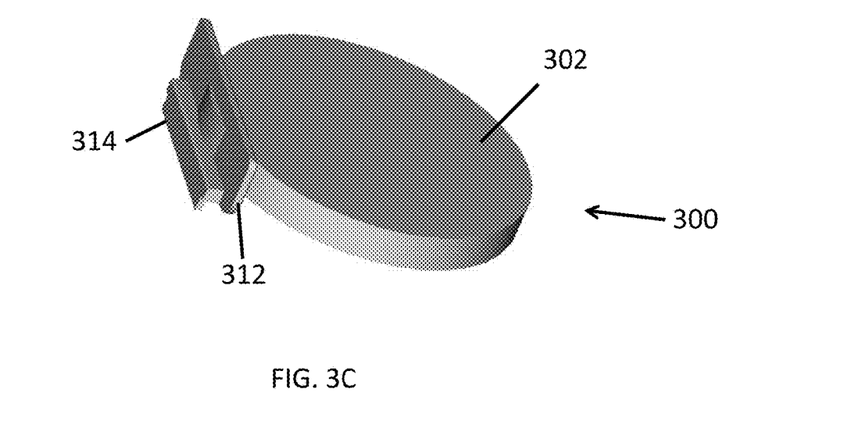
FIG. 3C illustrates a bottom perspective view of the shelf of FIG. 3A.

The brackets 100, 200 are intended to hold various attachable modules, such as the shelf 300 illustrated in FIGS. 3A-3C. Although the shelf 300 shown in the Figures is circular, it may have any other regular or irregular shape. The shelf 300 includes a shelf body 302 and a support 310. The body 302 includes a floor 304 and, optionally, a perimeter rim 306 extending upward from, and perpendicular to, the floor 304. The support 310 includes an elongated plate 312 to which the body 302 is connected. In the embodiment illustrated, a portion of the floor 304 and rim 306 extend through an opening in the plate 312 and are secured therein. Other methods of securing the body 302 to the support 310 may also be used. An L-shaped elongated tab 314 is attached to the plate 312 behind the upper edge of the plate 312.

Figure 4A:
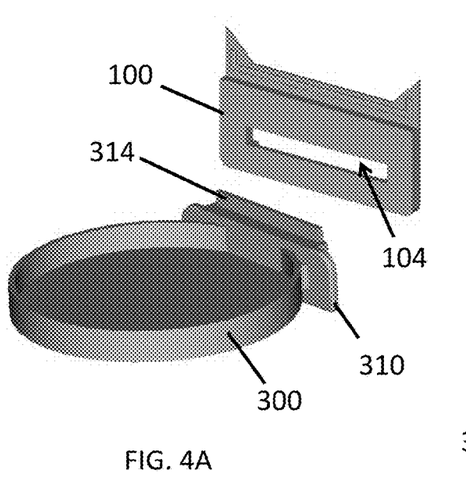
FIG. 4A illustrates a front perspective view of the shelf of FIG. 3A and the bracket of FIG. 1A.
Figure 4B:
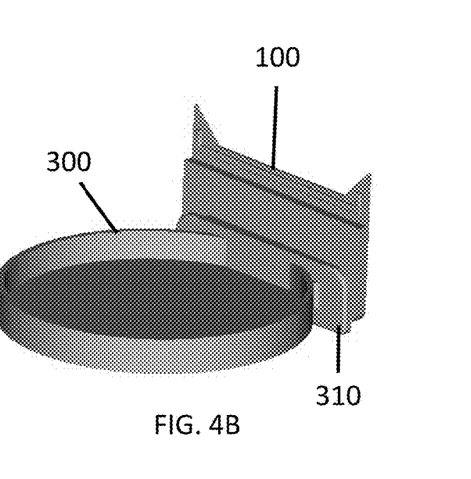
FIG. 4B illustrates a front perspective view of the shelf of FIG. 3A attached to the bracket of FIG. 1A.
Figure 4C:
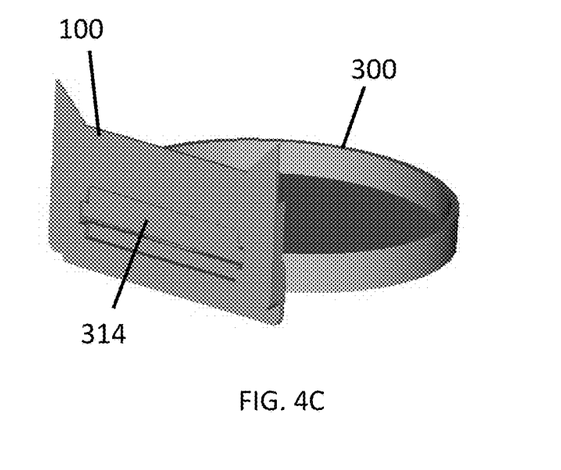
FIG. 4C illustrates a rear perspective view of the shelf of FIG. 3A attached to the bracket of FIG. 1A.

To attach the shelf 300 to the bracket 100 (or 200) after the bracket 100 has been secured to the cover 10, the shelf 300 is tilted upward so that the tab 314 can be inserted into the slot 104 (FIG. 4A). The shelf 300 is then lowered to a horizontal position with the plate 312 held against the base section 102 of bracket 100 and the tab 314 mated with the channel 102B, preventing the tab 314 from slipping from the slot 104 (FIGS. 4B, 4C). When the shelf 300 is installed in the bracket 100, the tab 314 fills the channel 102B in the rear of the base 102 so that the rear surface of the tab 314 is flush with the rear surface of the base 102 and tab section 106.

Figure 5:
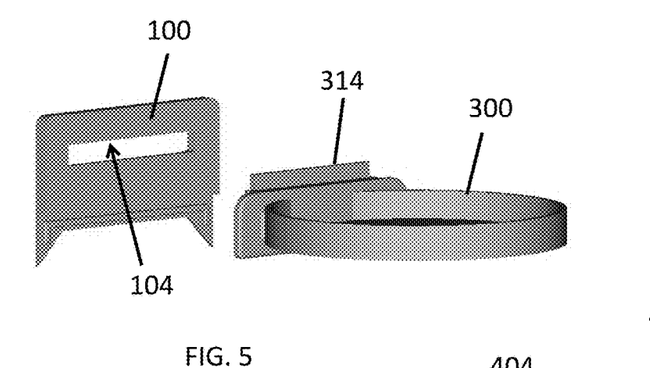
FIG. 5 illustrates a front perspective view of the shelf of FIG. 3A attached with the bracket of FIG. 1A inverted.

As noted above, the bracket 100 may be installed at the top of the cover 10 by rotating it 180°, as shown in FIG. 5. Installation of the shelf 300 remains the same.

FIG. 6A-6D illustrate views of another embodiment of a shelf 400 attachable to the bracket 200. The shelf 400 includes a shelf body 402 and a support 410. The body 402 includes a floor 404 and, optionally, a perimeter rim 406 extending upward from, and perpendicular to, the floor 404.

The support 410 includes an elongated horizontal plate 412 to which the body 402 is connected. In the embodiment illustrated, the floor 404 has an opening 408 formed therethrough useful, for example, for passing charging cables from an electronic device resting on the floor 404 to an electrical outlet.

Figure 6A:
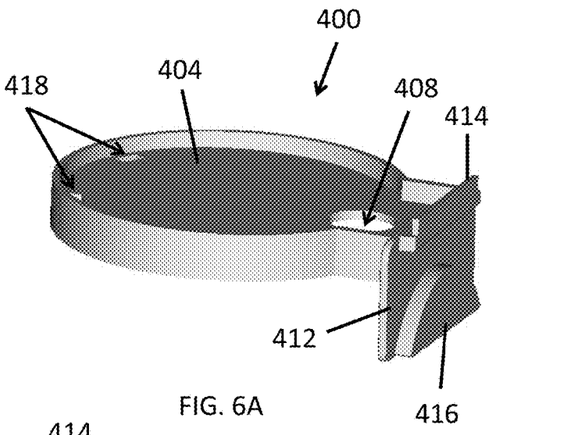
FIG. 6A illustrates a rear top perspective view of another embodiment of a shelf that is attachable to the brackets of FIG. 1A or FIG. 2A.

An L-shaped elongated tab 414 is attached to the plate 412 behind the upper edge of the plate 412. The rear of the plate 412 includes a semicircular member 416 that fits against a corresponding edge 208 (FIG. 2A) of the bracket 200, helping to hold the shelf 400 in securely place.

Figure 6B:
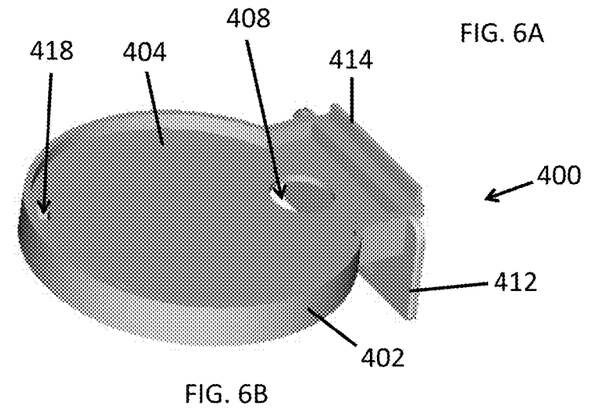
FIG. 6B illustrates a front top perspective view of the shelf of FIG. 6A.
Figures 6C, 6D, 7A:
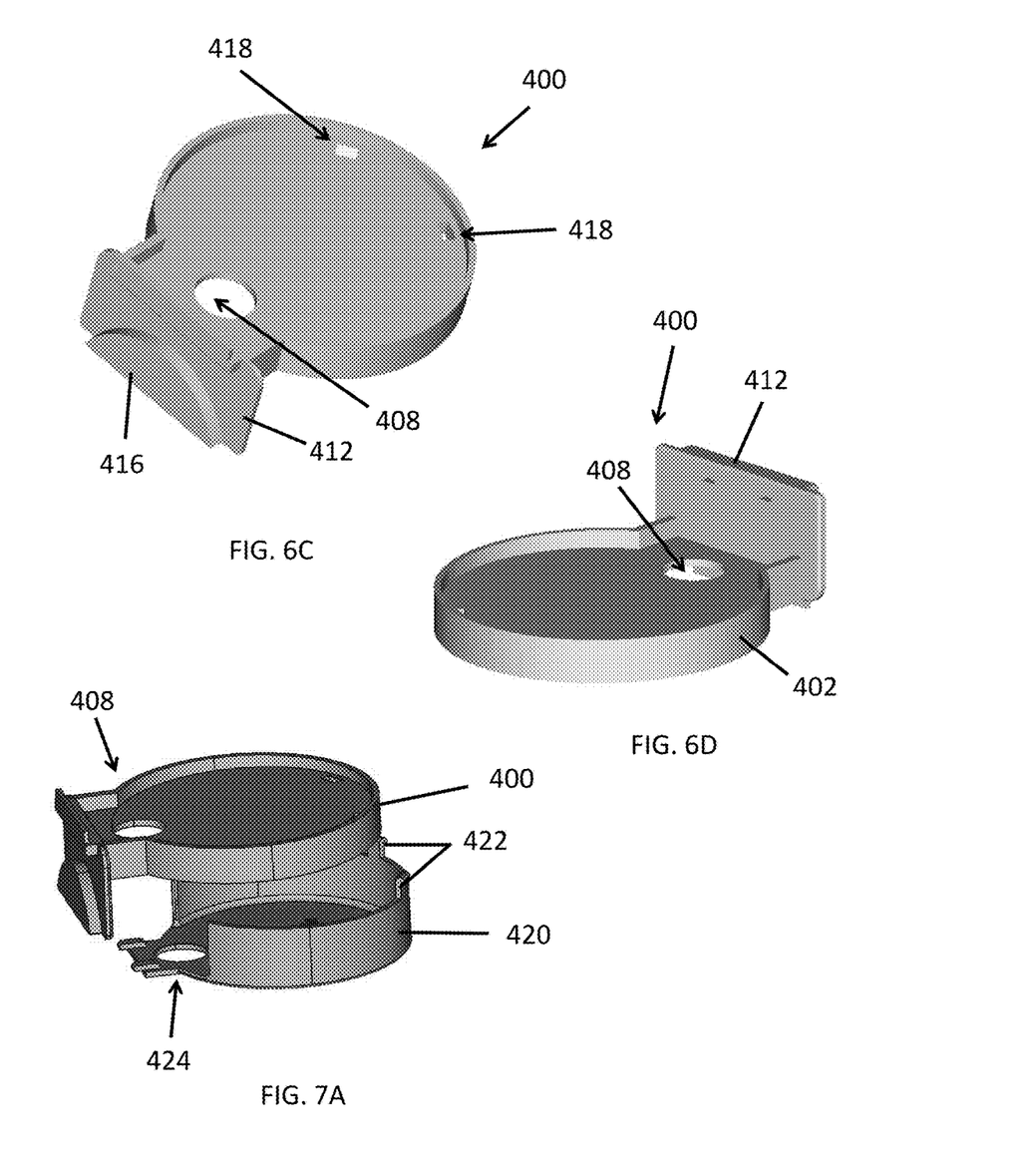
FIG. 6C illustrates another top perspective view of the shelf of FIG. 6A.
FIG. 6D illustrates a front bottom perspective view of the shelf of FIG. 6A.
FIG. 7A illustrates a side perspective view of the shelf of FIG. 6A with an attachable cable holder.
Figure 7B:
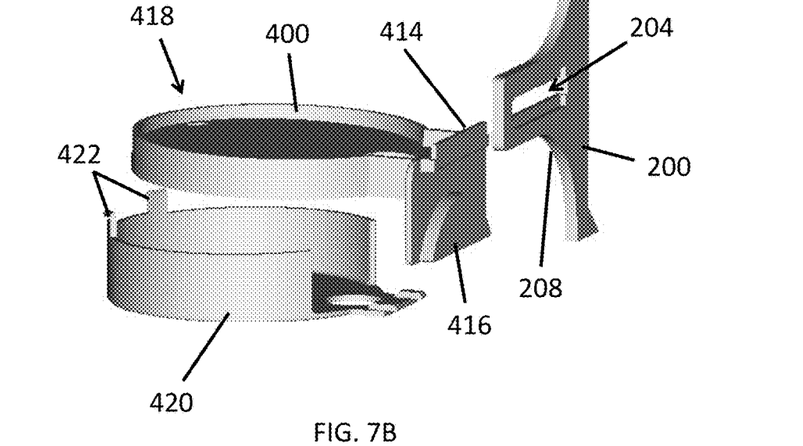
FIG. 7B illustrates a rear perspective view of the shelf and cable holder of FIG. 7A with the bracket of FIG. 1A.
Figure 7C:
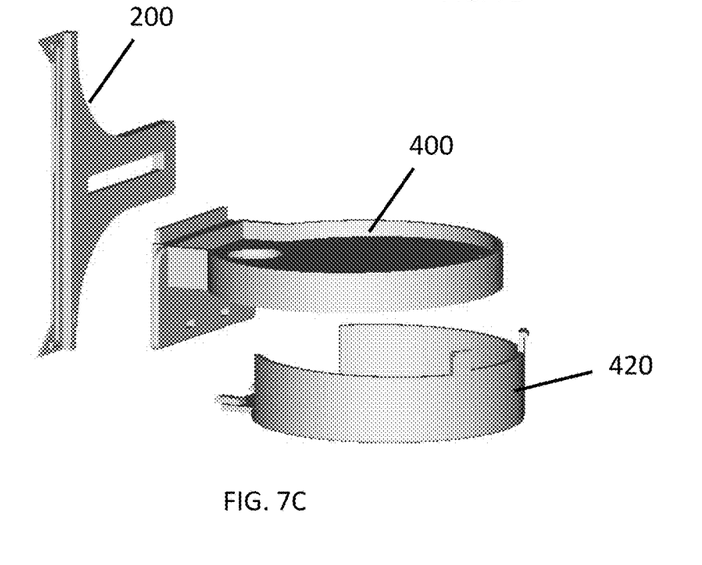
FIG. 7C illustrates a front perspective view of the shelf and cable holder of FIG. 7A with the bracket of FIG. 1A.

FIG. 7A illustrates a side perspective view of the shelf 400 of FIG. 6A with an attachable cable holder 420 having tabs 422 that snap into slots 418 in the floor 404 of the shelf 400 (FIG. 6B). The cable holder 420 may also have an opening 424. In use, an electrical device is placed on the floor 404 of the shelf 400. An end of a charging cable may be passed through the openings 424 and 408 and plugged into the device. The other end of the cable may be plugged into an electrical outlet and any unneeded cable coiled in the holder 420, which is then snapped onto the bottom of the shelf 400. The shelf 400 and holder 420 may then be attached to a bracket 200. FIGS. 7B and 7C illustrate the shelf 400, cable holder 420, and the bracket 200.

Figure 8A:
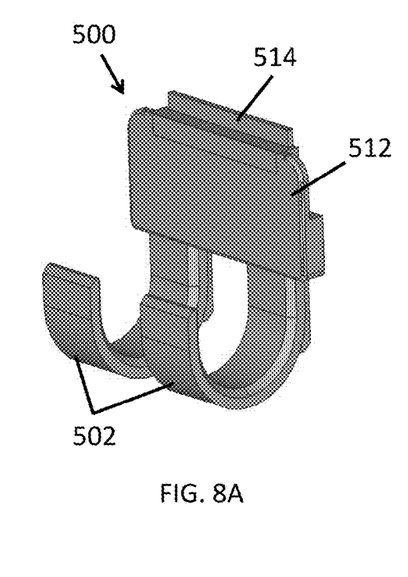
FIG. 8A illustrates a front perspective view of a set of hooks that is attachable to the brackets of FIG. 1A or FIG. 2A.
Figure 8B:
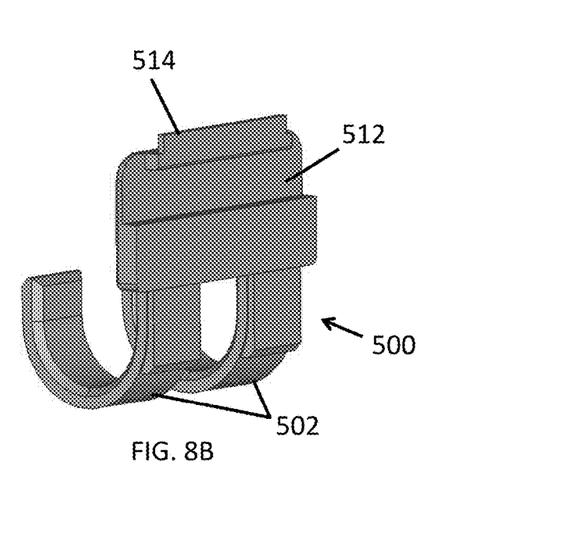
FIG. 8B illustrates a rear perspective view of the hooks of FIG. 8A.
Figure 9A:
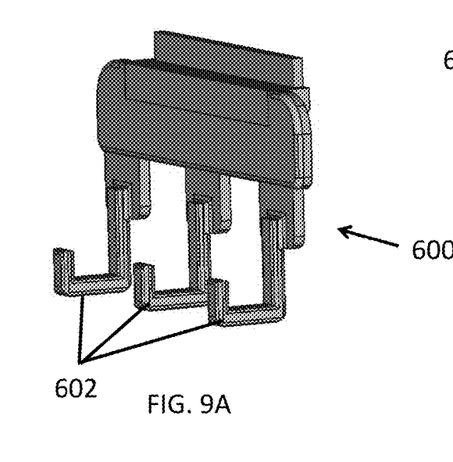
FIG. 9A illustrates a front perspective view of a key holder that is attachable to the brackets of FIG. 1A or FIG. 2A.
Figure 9B:
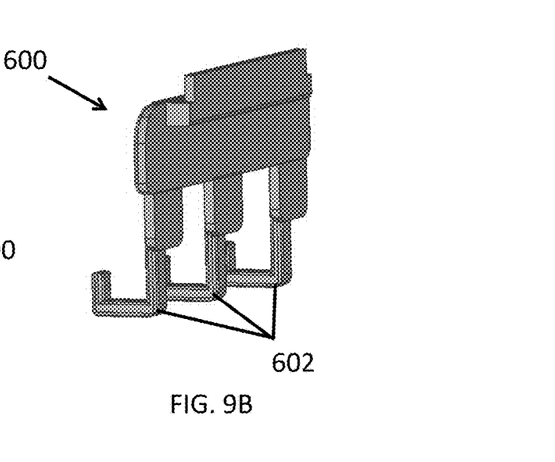
FIG. 9B illustrates a rear perspective view of the key holder of FIG. 9A.

As will be appreciated, modules other than shelves 300, 400 may be designed to connect to the brackets 100, 200. For example, FIGS. 8A and 8B illustrate module 500 with a pair of hooks 502 molded or secured to a support 510 having an elongated L-shaped tab 514 attached to the upper edge of a plate 512. A module 600 having three smaller hooks 602 is illustrated in FIGS. 9A and 9B.

Figure 10A:
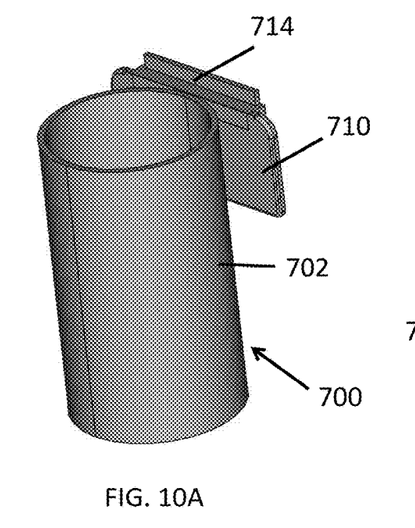
FIG. 10A illustrates a front perspective view of a open-top cylinder that is attachable to the brackets of FIG. 1A or FIG. 2A.
Figure 10B:
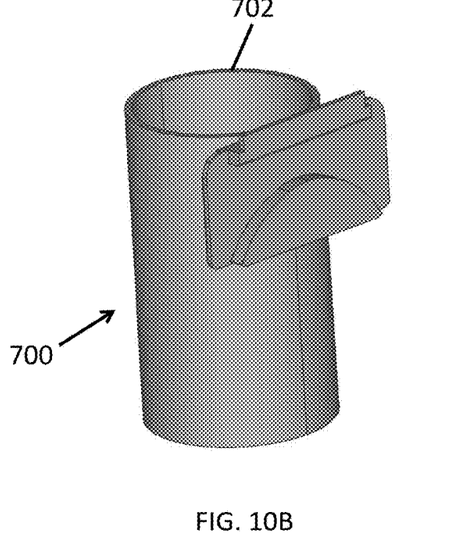
FIG. 10B illustrates a rear perspective view of the open-top cylinder of FIG. 10A.
Figure 11A:
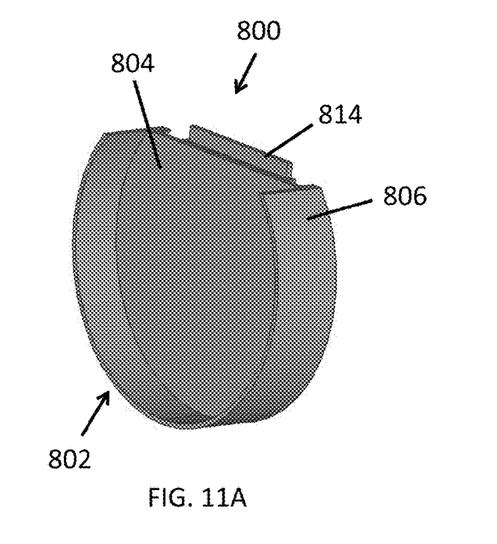
FIG. 11A illustrates a front perspective view of a voice-controlled assistant device holder that is attachable to the brackets of FIG. 1A or FIG. 2A.
Figure 11B:
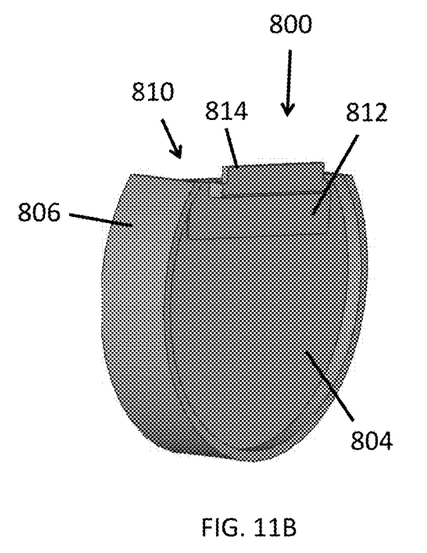
FIG. 11B illustrates a rear perspective view of the device holder of FIG. 11A.
Figure 11C:
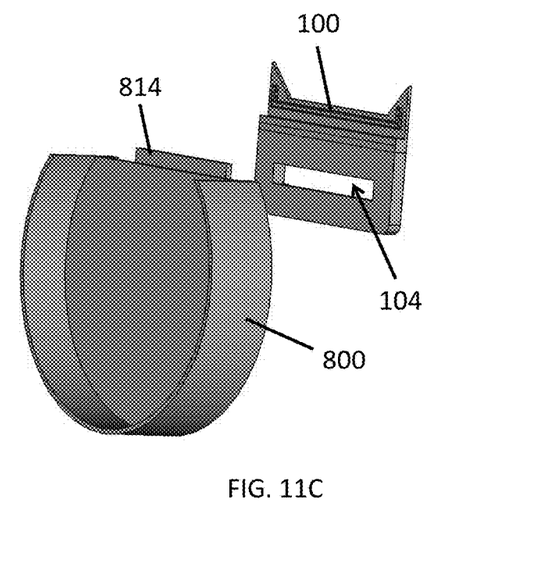
FIG. 11C illustrates a front perspective view of the device holder of FIG. 11A with the bracket of FIG. 1A.

FIGS. 10A and 10B illustrate another module 700, comprising an open-top cylinder 702 and a support 710. The support 710 shown in the Figures is the same as the support 400 described above and illustrated in FIGS. 6A-6D. However, the support 710 may instead be the same as the support 300 described above and illustrated in FIGS. 3A-3C. The module 700 attaches to the bracket 100 or 200 in the same way that the shelves 300 and 400 attached.

A module 800 for holding an electronic device, such as voice-controlled assistants Amazon Echo Dot and Google Home Mini, is illustrated in FIGS. 10A-10C. The module 800 is similar to the shelf 300 except that it retains the electronic device in a vertical orientation instead of horizontal to enhance the device's "hearing" and sound characteristics. The module 800 includes a body 802, with a floor 804 and perimeter rim 806, and a support 810. The support 810 includes a vertical plate 812, to which the body 802 is connected, and an L-shaped elongated tab 814 attached to the plate 812 behind an upper edge of the plate 812. The module 800 attaches to the bracket 100 or 200 in the same way that the shelf 300 are attached.

Figures 12, 13:
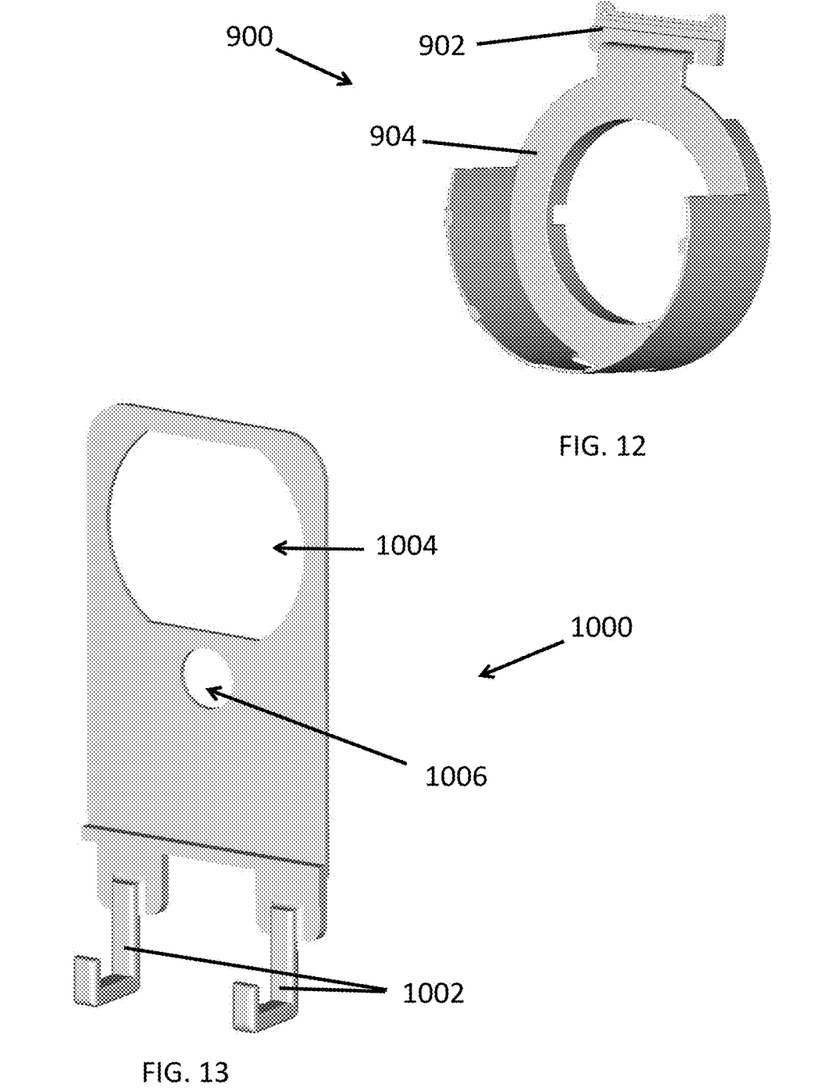
FIG. 12 illustrates a front perspective view of an embodiment of a module that combines a bracket and a holder.
FIG. 13 illustrates an embodiment of a module with hooks for hanging items from an outlet.

FIG. 12 illustrates a front perspective view of an embodiment of a module 900 that combines a bracket 902 and a holder 904. The module 900 illustrated may be used to retain items below an electrical switch or outlet cover plate. It will be appreciated that other modules, such as those described and illustrated above, may be integrated with the bracket as a single unit.

FIG. 13 illustrates an embodiment of a module 1000 with hooks 1002 for hanging items, such as keys, from an outlet. The module 100 includes an opening 1004 configured to fit around one of the receptacles of the outlet and the module 1000 may then be secured with a screw through another opening 1006 into a threaded opening in the outlet after which the outlet cover plate may be attached.

Thus, the weight of the module 1000 is supported by the receptacle. In another embodiment, the module 1000 may be the same size as a double outlet and include two openings 1004 and two screw openings 1006.

Figure 14:
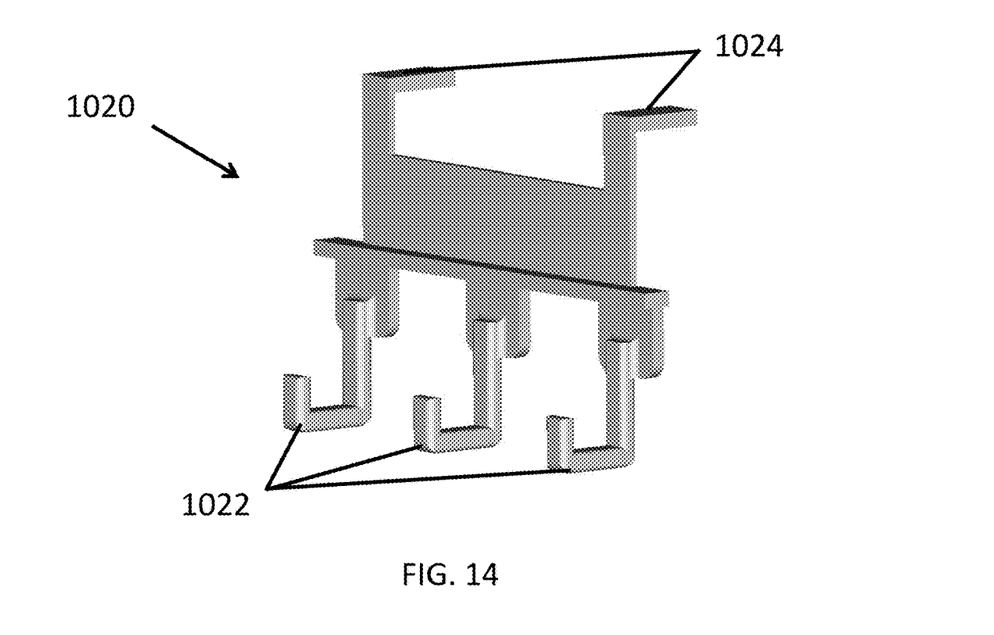
FIG. 14 illustrates another embodiment of a module with hooks for installation in an electrical outlet or switch box.

FIG. 14 illustrates another embodiment of a module 1020 with hooks 1022. The module may be installed in an electrical outlet or switch box, before the outlet or switch is installed, by inserting a pair of horizontal tabs 1024 into the bottom of the opening for the electrical box. The module 1020 will be held securely after the outlet or switch is screwed into the box and the cover plate screwed over the box.

Figure 15:
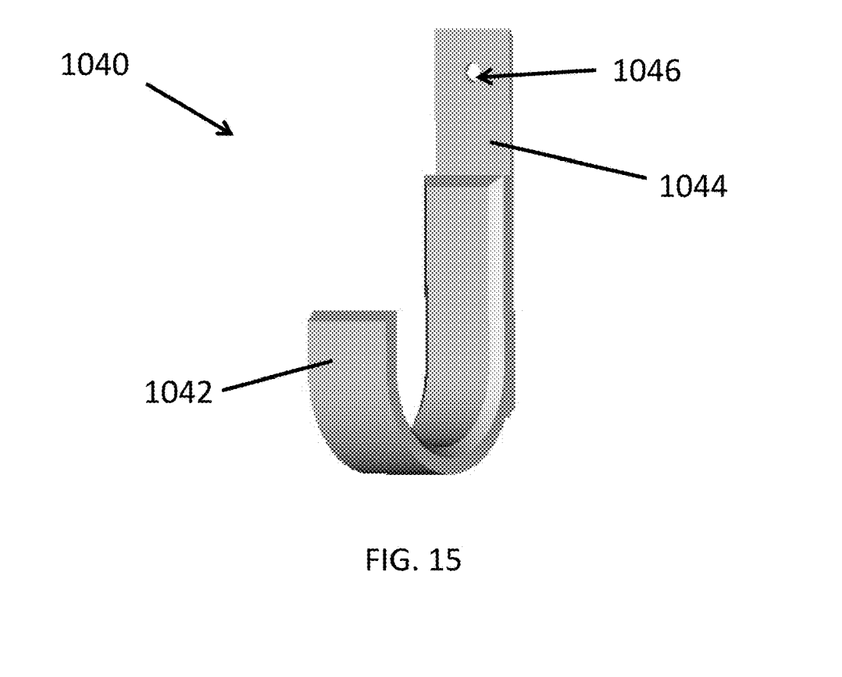
FIG. 15 illustrates still another embodiment of a module with a single hook for installation in an electrical outlet or switch box.

FIG. 15 illustrates still another embodiment of a module 1040 with a single hook 1042. The hook 1042 extends from a vertical tab 1044 having an opening 1046. The module 1040 may be secured to an outlet or switch by first removing the cover plate and unscrewing the bottom screw holding the outlet or switch in the electrical box. The bottom screw may then be inserted through the opening 1046 in the tab 1044 and screwed back into the screw hole in the outlet or switch, after which the cover plate may be reinstalled.

It will be appreciated that the modules 1000, 1020, and 1040 may be configured with members other than hooks. Furthermore, as with the bracket described in conjunction with FIGS. 1A-1C and FIGS. 2A-2C, the modules 900, 1000, 1020, and 1040 may be used with any unmodified or specially designed cover plate.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A removable bracket for an electrical outlet or switch cover, comprising:
    a base comprising a straight edge and having a rectangular slot formed therethrough, the slot to receive a tab of an attachable module, the base further comprising:
        a front base surface;
        a rear base surface;
        the rear base surface having a first channel formed therein adjacent to a first edge of the slot, into which the tab of the module can be attached to the bracket, wherein the bracket is securable to the electrical outlet or switch cover; and
    an elongated tab extending from the straight edge of the base and securable behind a first side edge, a second side edge, a top edge, or a bottom edge of the electrical outlet or switch cover, the elongated tab comprising:
        a thickness of the elongated tab is less than a thickness of the base;
        a rear tab surface contiguous with the rear base surface; and
        an elongated first ridge on a front tab surface of the elongated tab and parallel to the straight edge of the base.

2. The bracket of claim 1, further comprising a pair of side ridges of the removable bracket, having a length less than a length of the first ridge, extending from and perpendicular to ends of the first ridge.

3. The removable bracket of claim 1, wherein the slot is parallel to the straight edge and the elongated tab is securable behind the bottom edge of the electrical outlet or switch cover.

4. The removable bracket of claim 3, wherein the rear base surface has a second channel formed therein adjacent to a second edge of the slot, opposite the first edge of the slot, wherein the elongated tab is securable behind the top edge of the electrical outlet or switch cover.

5. The removable bracket of claim 1, wherein the slot is perpendicular to the straight edge, wherein the elongated tab is securable behind the first side edge of the electrical outlet or switch cover.

6. The removable bracket of claim 5, wherein the rear base surface has a second channel formed therein adjacent to a second edge of the slot, opposite the first edge of the slot, wherein the elongated tab is securable behind the second side edge, opposite the first side edge, of the electrical outlet or switch cover.

7. A system for holding items on an electrical outlet or switch cover, comprising:
   a removable bracket, comprising:
      a base comprising a straight edge and having a rectangular slot formed therethrough, the slot to receive a tab of an attachable module, the base further comprising:
         a front base surface;
         a rear base surface;
         the rear base surface having a first channel formed therein adjacent to a first edge of the slot, into which the tab of the module can be attached to the bracket, wherein the bracket is securable to an electrical outlet or switch cover; and
      an elongated tab extending from the straight edge of the base and securable behind a first side edge, a second side edge, a top edge, or a bottom edge of the electrical outlet or switch cover, the elongated tab comprising:
         a thickness of the elongated tab is less than a thickness of the base;
         a rear tab surface contiguous with the rear base surface; and
         an elongated first ridge on a front tab surface of the elongated tab and parallel to the straight edge of the base; and
   a module attachable to the bracket, comprising:
      a body; and
      a support, comprising:
         an elongated plate to which the body is secured;
         an elongated L-shaped tab attached to the elongated plate behind an edge of the elongated plate, the L-shaped tab insertable through the slot of the base of the bracket and mateable with the first channel in the base, whereby the module is retained on the bracket.

8. The system of claim 7, wherein the body comprises a horizontal shelf.

9. The system of claim 8, further comprising a cord holder snappable to a bottom of the horizontal shelf.

10. The system of claim 7, wherein the body comprises a one or more hooks.

11. The system of claim 7, wherein the body comprises an open-top cylinder.

12. The system of claim 7, wherein the body comprises:
   a vertically-oriented circular floor; and
   a rim extending from a perimeter of the floor;
   wherein the body is to retain a circular voice-controlled assistant.

13. The system of claim 7, wherein the slot in the base is parallel to the straight edge of the base and the elongated tab is securable behind the bottom edge of the electrical outlet or switch cover.

14. The system of claim 13, wherein the rear base surface has a second channel formed therein adjacent to a second edge of the slot, opposite the first edge of the slot, wherein the elongated tab is securable behind the top edge of the electrical outlet or switch cover.

15. The system of claim 7, wherein the slot is perpendicular to the straight edge and the elongated tab is securable behind the first side edge of the electrical outlet or switch cover.

16. The system of claim 15, wherein the rear base surface has a second channel formed therein adjacent to a second edge of the slot, opposite the first edge of the slot, wherein the elongated tab is securable behind the second side edge, opposite the first side edge, of the electrical outlet or switch cover.

* * * * *